(12) United States Patent
Nakamura et al.

(10) Patent No.: US 7,623,170 B2
(45) Date of Patent: Nov. 24, 2009

(54) AMPLIFICATION TYPE IMAGE PICKUP APPARATUS AND METHOD OF CONTROLLING THE AMPLIFICATION TYPE IMAGE PICKUP APPARATUS

(75) Inventors: Nobuo Nakamura, Yokohama (JP); Yoriko Tanaka, Nagoya (JP); Yoshitaka Egawa, Yokohama (JP); Shinji Ohsawa, Ebina (JP); Tadashi Sugiki, Yokohama (JP); Yukio Endo, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 637 days.

(21) Appl. No.: 11/154,604

(22) Filed: Jun. 17, 2005

(65) Prior Publication Data

US 2005/0231619 A1 Oct. 20, 2005

Related U.S. Application Data

(62) Division of application No. 09/342,729, filed on Jun. 29, 1999, now Pat. No. 6,930,722.

(30) Foreign Application Priority Data

Jun. 30, 1998 (JP) ................................ 10-185121

(51) Int. Cl.
*H04N 5/335* (2006.01)
(52) U.S. Cl. ..................................................... 348/297
(58) Field of Classification Search .................. 348/294, 348/303, 308, 297, 320, 295, 300
See application file for complete search history.

(56) References Cited

U.S. PATENT DOCUMENTS 4,054,915 A * 10/1977 Sugihara ..................... 348/283

(Continued)

FOREIGN PATENT DOCUMENTS

JP 59-75769 4/1984

(Continued)

OTHER PUBLICATIONS

U.S. Appl. No. 11/553,233, filed Oct. 26, 2006, Egawa, et al.

*Primary Examiner*—David L Ometz
*Assistant Examiner*—Ahmed A Berhan
(74) *Attorney, Agent, or Firm*—Oblon, Spivak, McClelland, Maier & Neustadt, L.L.P.

(57) ABSTRACT

An image pickup apparatus comprising an array of unit cells, vertical signal lines, and a control circuit. The unit cells are arranged in rows and columns. Each unit cell has a light-receiving device for receiving light and generating an electric charge corresponding to the light, a charge-accumulating section for accumulating the electric charge generated by the light-receiving device, a transfer device for transferring the electric charge from the light-receiving device to the charge-accumulating section, and a charge-limiting device for limiting the electric charge accumulated in the charge-accumulating section. The vertical signal lines extend along the columns of unit cells, respectively, each for receiving a electric data item corresponding to the electric charge accumulated in the charge-accumulating section of any unit cell of the associated column. The control circuit controls each of the unit cells, causing the charge-limiting device to limit the charge generated by the light-receiving device during a first period and transferred to the charge-accumulating section through the transfer device. The charge generated by the light-receiving device during a second period following the first period and transferred to the charge-accumulating section through the transfer device is added to the electric charge accumulated in the charge-accumulating section.

2 Claims, 9 Drawing Sheets

U.S. PATENT DOCUMENTS

| | | | |
|---|---|---|---|
| 4,488,163 A | | 12/1984 | Bluzer et al. |
| 4,551,742 A | | 11/1985 | Takemoto et al. |
| 4,975,777 A | | 12/1990 | Lee et al. |
| 5,164,832 A | * | 11/1992 | Halvis et al. ................ 348/250 |
| 5,229,857 A | * | 7/1993 | Taniji ......................... 348/305 |
| 5,512,950 A | | 4/1996 | Watanabe et al. |
| 5,572,256 A | | 11/1996 | Egawa et al. |
| 5,600,127 A | * | 2/1997 | Kimata .................... 250/208.1 |
| 5,986,297 A | | 11/1999 | Guidash et al. |
| 6,002,123 A | | 12/1999 | Suzuki |
| 6,011,251 A | | 1/2000 | Dierickx et al. |

FOREIGN PATENT DOCUMENTS

| | | |
|---|---|---|
| JP | 62-140567 | 6/1987 |
| JP | 4-281681 | 10/1992 |
| JP | 5-260392 | 10/1993 |
| JP | 8-205034 | 8/1996 |
| JP | 8-242408 | 9/1996 |
| JP | 8-256293 | 10/1996 |
| JP | 9-55888 | 2/1997 |
| JP | 9-200617 | 7/1997 |
| JP | 9-247536 | 9/1997 |
| JP | 10-90789 | 4/1998 |

* cited by examiner

AMPLIFICATION TYPE IMAGE PICKUP APPARATUS AND METHOD OF CONTROLLING THE AMPLIFICATION TYPE IMAGE PICKUP APPARATUS

CROSS-REFERENCE TO RELATED APPLICATIONS

This application is a division and claims the benefit of priority under 35 U.S.C. §120 from U.S. application Ser. No. 09/342,729, filed Jun. 29, 1999, and claims the benefit of priority under 35 U.S.C. §119 from Japanese patent Application No. 10-185121, filed Jun. 30, 1998, the entire contents of which are incorporated herein by reference.

BACKGROUND OF THE INVENTION

The present invention relates to a solid-state image pickup apparatus, and more particularly to a technique of increasing the dynamic range of a solid-state image pickup apparatus of amplification type.

One of the important features of solid-state image pickup apparatuses is dynamic range. The dynamic range is determined by the signal charge that can be accumulated in each unit cell. The smaller the unit cell, the smaller the capacitance for accumulating the signal charge, and the smaller the saturated signal charge. If the saturated signal charge is small, it will be impossible to increase the dynamic range.

No sufficient measures are taken to increase the dynamic range, in conventional solid-state image pickup apparatuses of amplification type. Consequently, the conventional solid-state pickup apparatuses of this type cannot have high performance.

BRIEF SUMMARY OF THE INVENTION

The object of the present invention is to provide a solid-state image pickup apparatus the dynamic range of which can be increased, and also to provide a method of controlling the solid-state image pickup apparatus.

According to the first aspect of the invention, there is provided an image pickup apparatus which comprises: an array of unit cells arranged in rows and columns, each unit cell having a light-receiving device for receiving light and generating an electric charge corresponding to the light, a charge-accumulating section for accumulating the electric charge generated by the light-receiving device, a transfer device for transferring the electric charge from the light-receiving device to the charge-accumulating section, and a charge-limiting device for limiting the electric charge accumulated in the charge-accumulating section; a plurality of vertical signal lines extending along the columns of unit cells, respectively, each for receiving a electric data item corresponding to the electric charge accumulated in the charge-accumulating section of any unit cell of the associated column; and a control circuit for controlling each of the unit cells, causing the charge-limiting device to limit the charge generated by the light-receiving device during a first period and transferred to the charge-accumulating section through the transfer device and, adding, to the electric charge accumulated in the charge-accumulating section, the charge generated by the light-receiving device during a second period following the first period and transferred to the charge-accumulating section through the transfer device.

In each unit cell, the charge in the charge-accumulating section will be saturated if the light-receiving device receives a large amount of light. This may decrease the dynamic range of the image pickup apparatus. To prevent the dynamic range from decreasing, the charge generated by the light-receiving device during a period and transferred to the charge-accumulating section is limited (that is, a part of the charge is skimmed). The charge that the light-receiving device generates during a later period is added to the charge accumulated in the charge-accumulating section. The unit cell can therefore exhibit different photoelectric conversion characteristics during the first period and the second period, respectively. The first period may be longer than the second period, in which case the dynamic range can be increased.

In the first aspect of the invention, it is preferable that the control circuit control each of the unit cells of the same row such that the charge-limiting device limits the charge accumulated in the charge-accumulating section, during a horizontal blanking period and the charge transferred to the charge-accumulating section is added to the charge accumulated in the charge-accumulating section, during a different horizontal blanking period.

That is, the charges are limited and added in the unit cells of different rows during the same horizontal blanking period (i.e., the period between two adjacent horizontal effective periods, during which signals are read from the cells to the vertical signal line). In other words, signal charges are limited in the unit cells of one row, while signal charges are added in the unit cells of the another row.

Thus, in each unit cell, the signal charge is limited during a horizontal blanking period and signal charges are added during another horizontal blanking period. As a result, the unit cell exhibits different photoelectric conversion characteristics during one-frame period. This makes it possible to increase the dynamic range of the image pickup apparatus.

In the first aspect of the invention, it is alternatively desired that the control circuit controls the unit cells such that the charge-limiting device limits the charge to be accumulated in the charge-accumulating section and the charge transferred to the charge-accumulating section is added to the charge accumulated in the charge-accumulating section, during the same vertical blanking period in all cell units.

That is, the charge is limited and the charges are added in each unit cell during the same vertical blanking period (i.e., the period between two adjacent frame). Hence, not only the dynamic range of the image pickup apparatus can be increased, but also the signals can be read out with sufficient simultaneity.

In the first aspect of the invention, it is desired that each unit cell have a light-receiving device for receiving light and generating an electric charge corresponding to the light, a charge-accumulating section for accumulating the electric charge generated by the light-receiving device, a first transistor having a first control terminal and connected between the light-receiving device and the charge-accumulating section, for transferring the charge generated in the light-receiving device to the charge-accumulating section when a transfer signal is supplied to the first control terminal, and a second transistor having a second control terminal and connected to the charge-accumulating section, for limiting the charge accumulated in the charge-accumulating section when a voltage between off voltage and on voltage is applied to the second terminal.

According to the second aspect of the invention, there is provided a method of controlling an image pickup apparatus comprising: an array of unit cells arranged in rows and columns, each unit cell having a light-receiving device for receiving light and generating an electric charge corresponding to the light, a charge-accumulating section for accumulating the electric charge generated by the light-receiving device, a transfer device for transferring the electric charge from the light-receiving device to the charge-accumulating section, and a charge-limiting device for limiting the electric charge accumulated in the charge-accumulating section; a plurality of vertical signal lines extending along the columns of unit cells, respectively, each for receiving a electric data item corresponding to the electric charge accumulated in the charge-accumulating section of any unit cell of the associated column. The method comprising the steps of: transferring the charge generated by the light-receiving device during a first period to the charge-accumulating section through the transfer device; limiting the charge transferred to the charge-accumulating section, by means of the charge-limiting device; and transferring the charge generated by the light-receiving device during a second period following the first period, to the charge-accumulating section through the transfer device, thereby adding the charge generated during the second period to the charge limited by the charge-limiting device.

According to the third aspect of the invention, there is provided an image pickup apparatus which comprises: an array of unit cells arranged in rows and columns, each having a light-receiving device for receiving light and generating an electric charge corresponding to the light; a plurality of vertical signal lines extending along the columns of unit cells, respectively, each for receiving a electric data item corresponding to the electric charge generated by the light-receiving device of any unit cell of the associated column; a control circuit for controlling each of the unit cells of the same row such that electric data items corresponding to electric charges generated by the light-receiving device during different periods, respectively, are read through the vertical signal line; and a data-holding circuit for temporarily holding the electric data items read by the control circuit, so as to add the electric data items in an external circuit.

In this image pickup apparatus, electric data items corresponding to electric charges generated by the light-receiving device during different periods, respectively, are read through the vertical signal line. Therefore, a composite photoelectric conversion characteristic can be obtained if the electric data items read are added by means of, for example, a signal-processing circuit. In this case, the unit cells can have different photoelectric conversion characteristics merely by varying the charge-generating periods. The dynamic range of the image pickup apparatus can thereby be increased.

In the third aspect of the invention, it is preferred that the control circuit controls each of the unit cells of the same row such that the electric data items are read from the unit cell through the vertical signal line during different horizontal blanking periods, respectively. This means that electric data items are read from the unit cells of the different rows during the same horizontal blanking period.

Since the electric data items are read from each unit cell through the vertical signal line during different horizontal blanking periods, the unit cell can exhibit different photoelectric conversion characteristics during one-frame period. This makes it possible to increase the dynamic range of the image pickup apparatus.

According to the fourth aspect of the invention, there is provided an image pickup apparatus which comprises: an array of unit cells arranged in rows and columns, each having a light-receiving device for receiving light and generating an electric charge corresponding to the light; a plurality of vertical signal lines extending along the columns of unit cells, respectively, each for receiving a electric data item corresponding to the electric charge generated by the light-receiving device of any unit cell of the associated column; a vertical control circuit for controlling the unit cells such that electric data items generated by the unit cells of different rows are read to the vertical signal lines during the same horizontal blanking period, and that electric data items corresponding to electric charges generated by the light-receiving device of each unit cell of the same row during different periods, respectively, are read through the vertical signal lines during different horizontal blanking periods; a plurality of data-holding circuits for temporarily holding the electric data items read from the unit cells of different rows during the same horizontal blanking period under the control of the vertical control circuit; a horizontal control circuit for controlling reading of the electric data items from the data-holding circuits; a storage circuit for storing the electric data items read from the data-holding circuits under the control of the horizontal control circuit; and an adder circuit for adding those electric data items stored in the storage circuit, which correspond to the charges generated by the same light-receiving device during different periods.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described, with reference to the accompanying drawings.

First Embodiment

Figure 1:
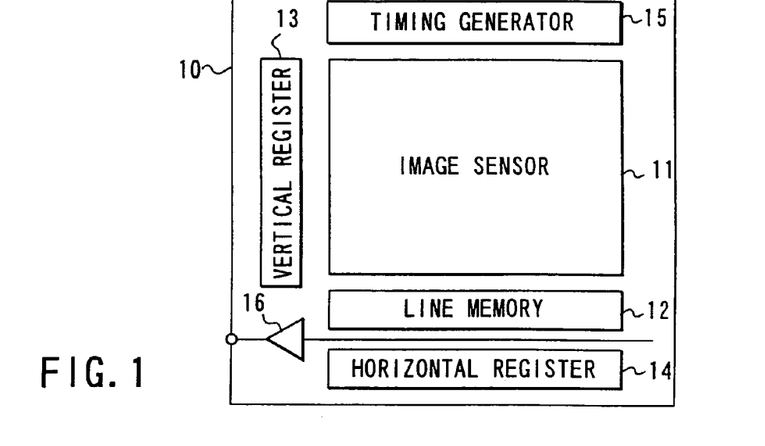
FIG. 1 is a block diagram showing the basic structure of a solid-state image pickup apparatus of amplification type, which is the first embodiment of the invention.

FIG. 1 is a block diagram showing the main section of a typical solid-state image pickup apparatus of amplification type, which is the first embodiment of the invention.

As FIG. 1 shows, the image pickup apparatus comprises an image sensor 11, a line memory 12, a vertical register 13, a horizontal register 14, a timing generator 15, and an on-chip amplifier 16. The components 11 to 16 are provided on the semiconductor substrate 10.

The image sensor 11 has a plurality of unit cells (not shown) and a plurality of vertical signal lines (not shown). The unit cells are arranged in rows and columns. The vertical signal lines extend along the columns of unit cells. Each unit cell accumulates signal charge representing data (electrical information). The data is read to a vertical signal line when the vertical register 13 outputs a control signal to the unit cell, in response to a timing signal supplied from the timing generator 15. The data, thus read, is stored into the line memory 12. The horizontal register 14 is driven, thereby reading the data (i.e., an electric signal) from the line memory 12 and outputting the same from the image pickup apparatus via the on-chip amplifier 16.

Figure 2:
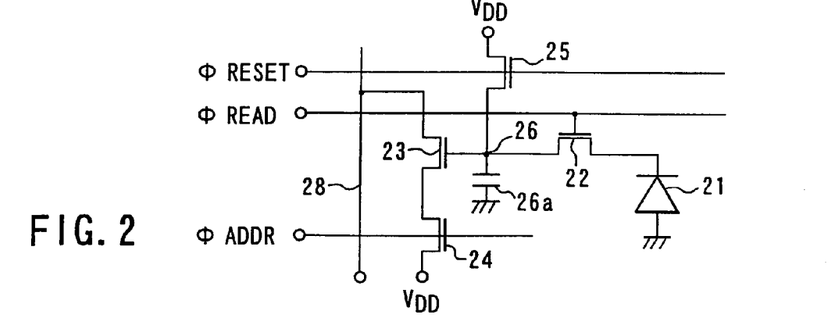
FIG. 2 is an equivalent circuit diagram of one of the unit cells incorporated in the image pickup apparatus shown in FIG. 1.

FIG. 2 is an equivalent circuit diagram of one of the unit cells. As shown in FIG. 2, the unit cell comprises a photodiode 21, a transfer (reading) transistor 22, an amplifying transistor 23, an address transistor 24, a reset transistor 25, and a detection node 26. The transfer transistor 22, address transistor 24 and reset transistor 25 are respectively controlled by control signals Φread, Φaddr and Φreset which have been supplied from the vertical register 13 (FIG. 1).

The basic operation of the unit cell shown in FIG. 2 will be described below.

When light is applied though a lens (not shown) to the photodiode 21, the photodiode 21 generates a signal charge Qsig (either electron charge or hole charge) from the light. (That is, the photodiode 21 performs photoelectric conversion.) When the control signal Φread is supplied to the transfer transistor 22, the transistor transfers the signal charge Qsig to the detection node 26. The signal charge Qsig is accumulated in the parasitic capacitance 26a of the detection node 26.

The signal charge Qsig in the parasitic capacitance 26a is converted to a voltage signal Vsig. Assume that the capacitance C of the detection node 26 is constant. Then, Vsig=Qsig/C. The signal Vsig is read through the amplifying transistor 23 to the vertical signal line 28 when the address signal Φaddr turns on the address transistor 24.

Figure 3:
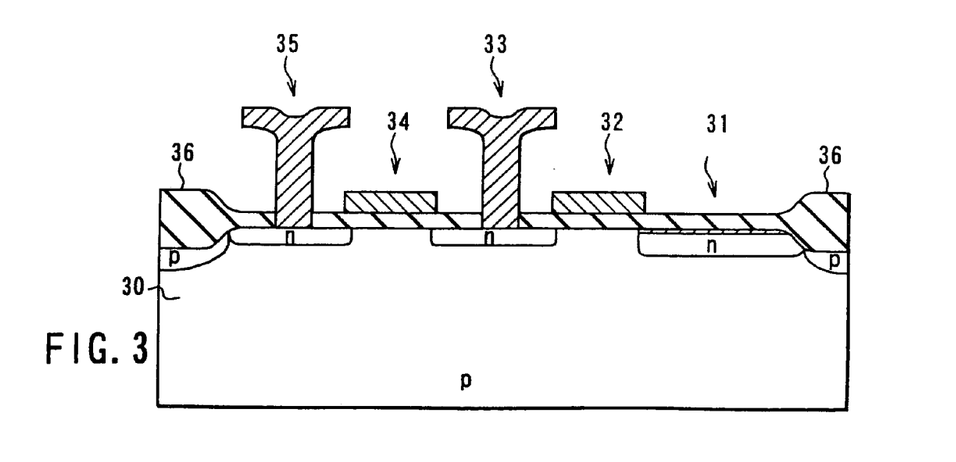
FIG. 3 is a sectional view showing one of the unit cells incorporated in the image pickup apparatus shown in FIG. 1.

FIG. 3 is a sectional view of the unit cell region of the solid-state image pickup apparatus (FIG. 1) and illustrates one of the unit cells.

The unit cell comprises a photodiode 31, a transfer transistor 32 (i.e., transfer gate), a detection node 33, a reset transistor 34 (i.e., reset gate), and a power supply section 35. (The photodiode 31 has a p-type region in the surface of a charge-accumulating region of n type.) The components 31 to 35 are provided on a P-type silicon substrate 30. (The substrate 30 may be replaced by an N-type silicon substrate having a p-type well.) The unit cell is electrically isolated from any other unit cell by a LOCOS element-isolating region 36. A capacitor may be connected in parallel to the parasitic capacitance of the detection node 33.

The photodiode 31, transfer transistor 32, detection node 33 and reset transistor 34 are equivalent to the photodiode 21, transfer transistor 22, detection node 26 and reset transistor 25, all shown in FIG. 2, respectively. The transfer transistor 32 and the reset transistor 34 are controlled, also by the control signals Φread and Φreset (FIG. 2), both supplied from the vertical register 13 (FIG. 1).

How the image pickup apparatus, or the first embodiment of the invention, operates will be described with reference to FIGS. 4A to 4F. FIGS. 4A to 4F show the various potentials, which the components of the unit cell shown in FIG. 3 have while the image pickup apparatus is operating.

The element-isolating region 36 has a potential a little lower than 0V, due to the p-type region provided below the region 36. Generally, the photodiode 31 has a potential of about 1V. Nonetheless, it may have a potential of 1V or more, as np-type photodiodes.

Figure 4A:
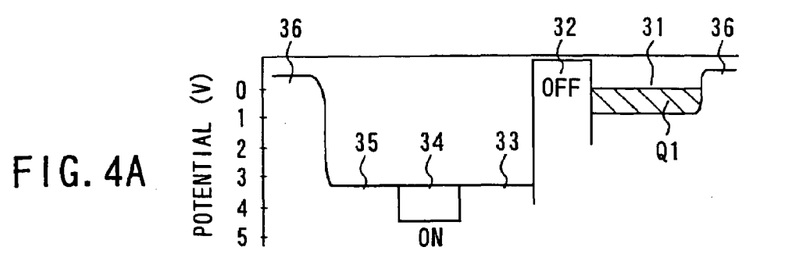
FIGS. 4A to 4F are diagrams explaining the sequence of operation of the image pickup apparatus shown in FIG. 1.

As shown in FIG. 4A, the photodiode 31 accumulates signal charge Q1 and has the potential shown. In other words, the photodiode 31 holds the signal charge built in it in a predetermined period, because the transfer transistor 32 remains off. This accumulation of signal charge will be referred to as "first accumulation." At this time, the reset transistor 34 is on, whereby the detection node 33 is reset at the same potential as the power supply section 35. (The power supply voltage is 3.3V in the image pickup apparatus shown FIG. 1.)

Figure 4B:
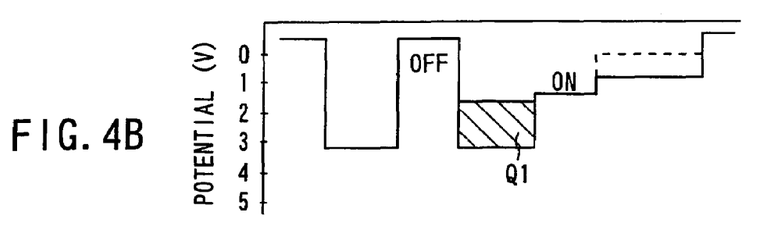

Then, the reset transistor 34 is turned off, and the transfer transistor 32 is turned on, as is illustrated in FIG. 4B. As a result, the potential of the transfer transistor 32 increases, and the signal charge Q1 is applied from the photodiode 31 to the detection node 33. Since the signal charge Q1 is applied to the node 33 in its entirety, the potential of the photodiode 31 increases in accordance with the signal charge Q1.

Figure 4C:
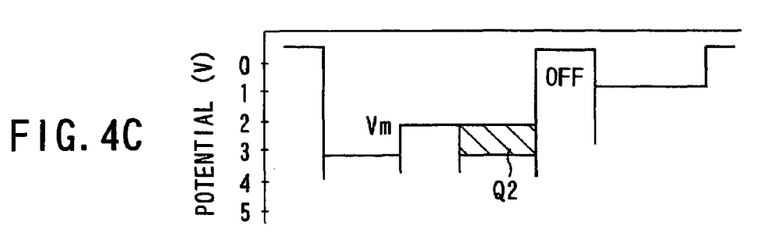

Next, as shown in FIG. 4C, a prescribed voltage Vm is applied to the reset transistor 34. The voltage Vm has a value between the on-voltage and off-voltage of the reset transistor 34. Therefore, a part of the signal charge Q1 is skimmed from the detection node 33. As a result, signal charge Q2 is left in the detection node 33. Thus, the reset transistor 34 sets a limit to the charge accumulated in the detection node 33. The voltage Vm may be applied to the reset transistor 33 in two alternative methods. The first method is to apply the voltage Vm in the form of a pulse voltage. The second is to apply the voltage Vm in the form of a DC voltage. The first method is more desirable in view of the reliability of the gate insulating film of the reset transistor 34.

Figure 4D:
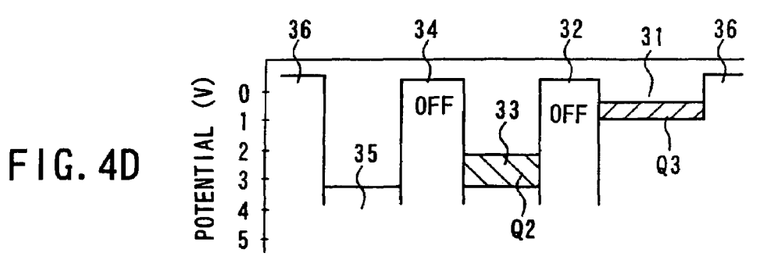

Further, as shown in FIG. 4D, signal charge is accumulated in the photodiode 31 for the second time, for a time shorter than the time of the first accumulation. As a result, the photodiode 31 accumulates signal charge Q3.

Figure 4E:
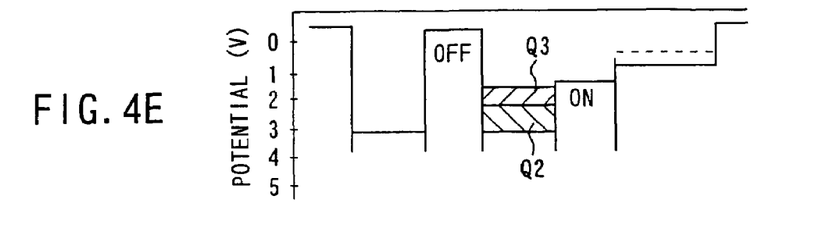

Then, the transfer transistor 32 is turned on as shown in FIG. 4E. The signal charge Q3 is thereby transferred to the detection node 33. The signal charge Q3 is added to the signal charge Q2 remaining in the detection node 33.

Figure 4F:
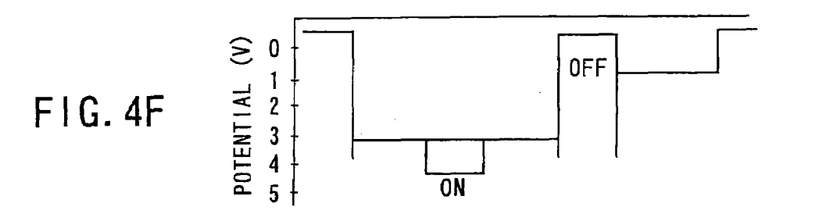

When the signal charge Q3 is added to the signal charge Q2, the reset transistor 34 resets the detection node 33 as is illustrated in FIG. 4F. The detection node 33 is therefore set at the initial potential.

Figure 5:
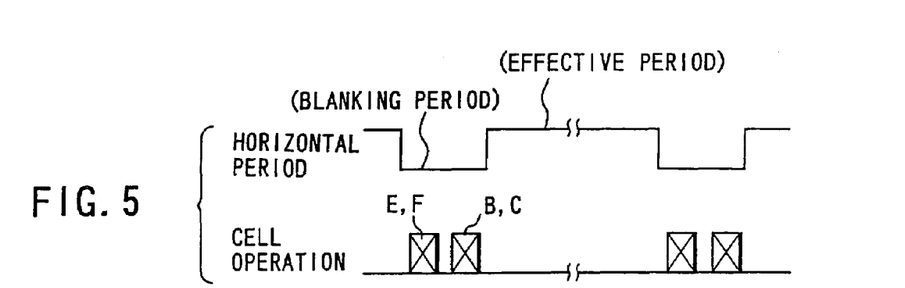
FIG. 5 is a timing chart illustrating how the image pickup apparatus of FIG. 1 operates, mainly during the horizontal period.
Figure 6:
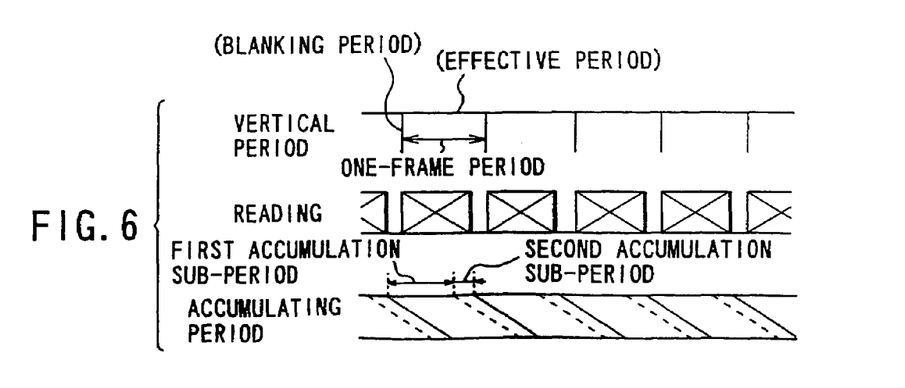
FIG. 6 is a timing chart illustrating how the image pickup apparatus of FIG. 1 operates, mainly during the vertical period.

FIGS. 5 and 6 are timing charts illustrating the operation of the image pickup apparatus, which has been described with reference to FIGS. 4A to 4F.

FIG. 5 shows how the cells of different rows operate during the same horizontal blanking period. In the same horizontal blanking period, signals are added (FIG. 4E) in each unit cell of one row and a signal is read from the unit cell to the vertical line (FIG. 4F), whereas in each unit cell of another row, a part of a signal charge is skimmed from the detection node (FIGS. 4B and 4C). In each unit cell of any row, a part of the signal charge is skimmed from the detection node during a horizontal blanking period, and signals are added and a signal is read to the vertical signal line during another horizontal blanking period.

FIG. 6 is a timing chart illustrating how the image pickup apparatus of FIG. 1 operates, mainly during a vertical period. As can be understood from FIG. 6, signals are read from the image sensor in units of frames. Signal charges are accumulated in first and second accumulation periods. The accumulation of signal charges proceeds in the vertical direction, or along the Y axis of FIG. 6, which corresponds to the vertical direction of the image sensor 11 illustrated in FIG. 1. Of the signal charges accumulated in the first accumulation period, those larger than a preset value are skimmed from the detection nodes. The signal charge accumulated in each unit cell during the second accumulation period is added to the signal charge accumulated the unit cell during the first accumulation period. The signals obtained by this addition in the unit cells of each row are sequentially read, at the times indicated by slant solid lines in FIG. 6. The simultaneity of reading image signals is important, particularly if the image is one that moves fast. The simultaneity is not important when the frame frequency is 30 Hz or more.

As described above, those of the signal charges accumulated in the first accumulation period, which are larger than a preset value, are skimmed in the present embodiment. In addition, the first accumulation period is longer than the second accumulation period. Therefore, the image sensor 11 can exhibit two different photoelectric conversion characteristics, one for light beams of standard intensity and the other for light beams of high intensity. This helps increase the dynamic range of the solid-state image pickup apparatus.

In the above embodiment, the accumulation period is divided into two sub-periods, it may be possible that the accumulation period is divided into three or more sub-periods.

Second Embodiment

The second embodiment of the invention, which is a solid-state image pickup apparatus of amplification type, will be described with reference to the timing charts of FIGS. 7 and 8. The second embodiment is designed for use in electronic still cameras having a mechanical shutter each.

Figure 7:
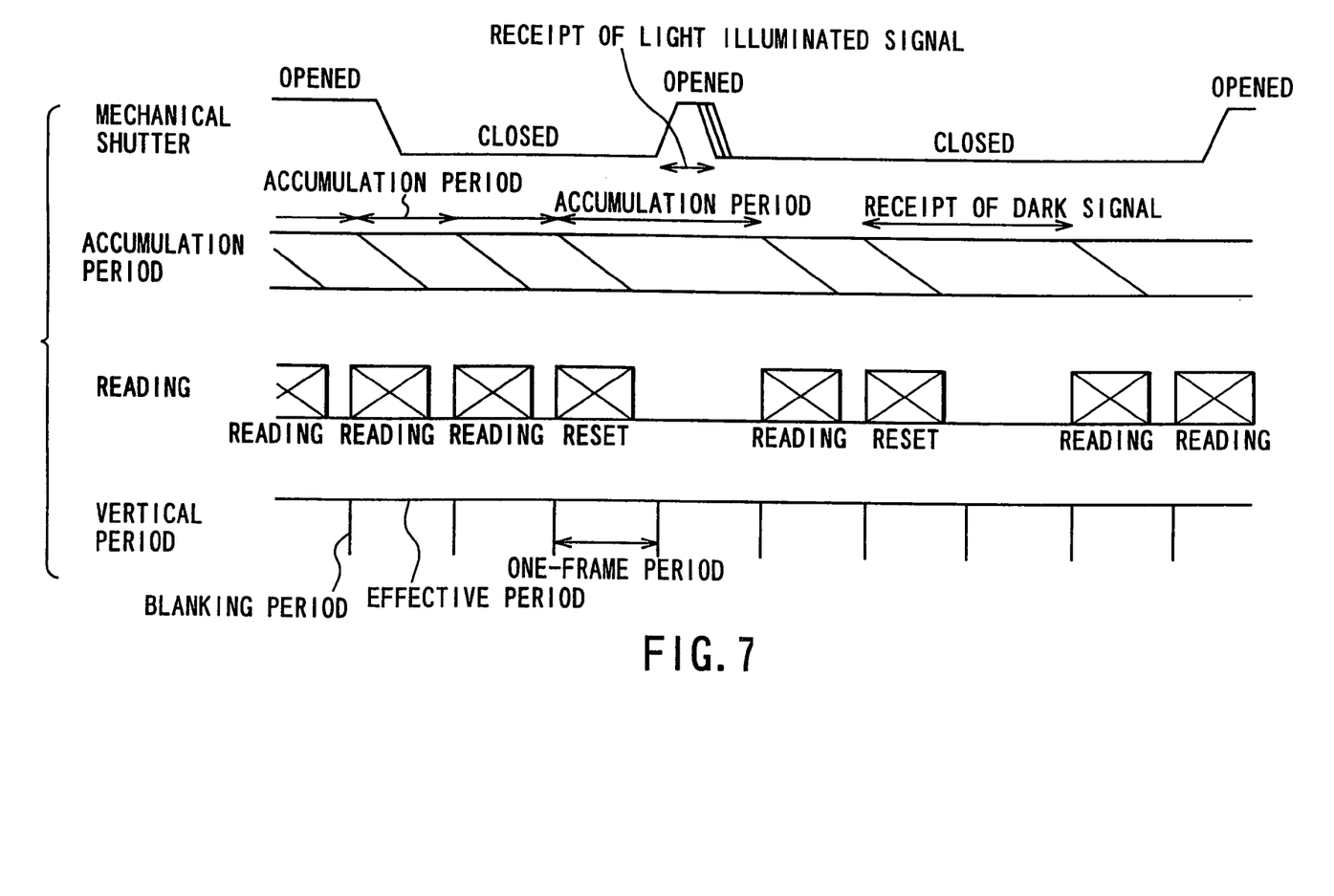
FIG. 7 is a timing chart explaining how the second embodiment of this invention operates.

FIG. 7 explains how this solid-state image pickup apparatus operates if the photodiode provided in each unit cell is of incomplete transfer type, such as an np-type photodiode.

Assume that the image sensor pick up an ordinary image and that the unit cells of the image sensor generates signals. In this case, the signals are read from the image sensor in units of frames. After reading the signals from the image sensor, the image sensor is reset, as is required because the photodiodes are of incomplete transfer type, such as np-type photodiodes. The signal charges are thereby extracted from the photodiodes, thus skimming bias charges therefrom.

After resetting the image sensor, the mechanical shutter is opened. The shutter remains open for a period of time, during which light illuminated signals are stored in the image sensor. The shutter is thereafter closed to read signals from the image sensor. The image sensor is reset again, then dark signals generated while the shutter remains closed are stored in the image sensor. Then, the dark signals are read out from the image sensor. The difference between each dark signal and the corresponding light illuminated signal is obtained, thereby removing noises such as background irregularities and white defects. If these noises are not so prominent, it is unnecessary to read the dark signals.

Figure 8:
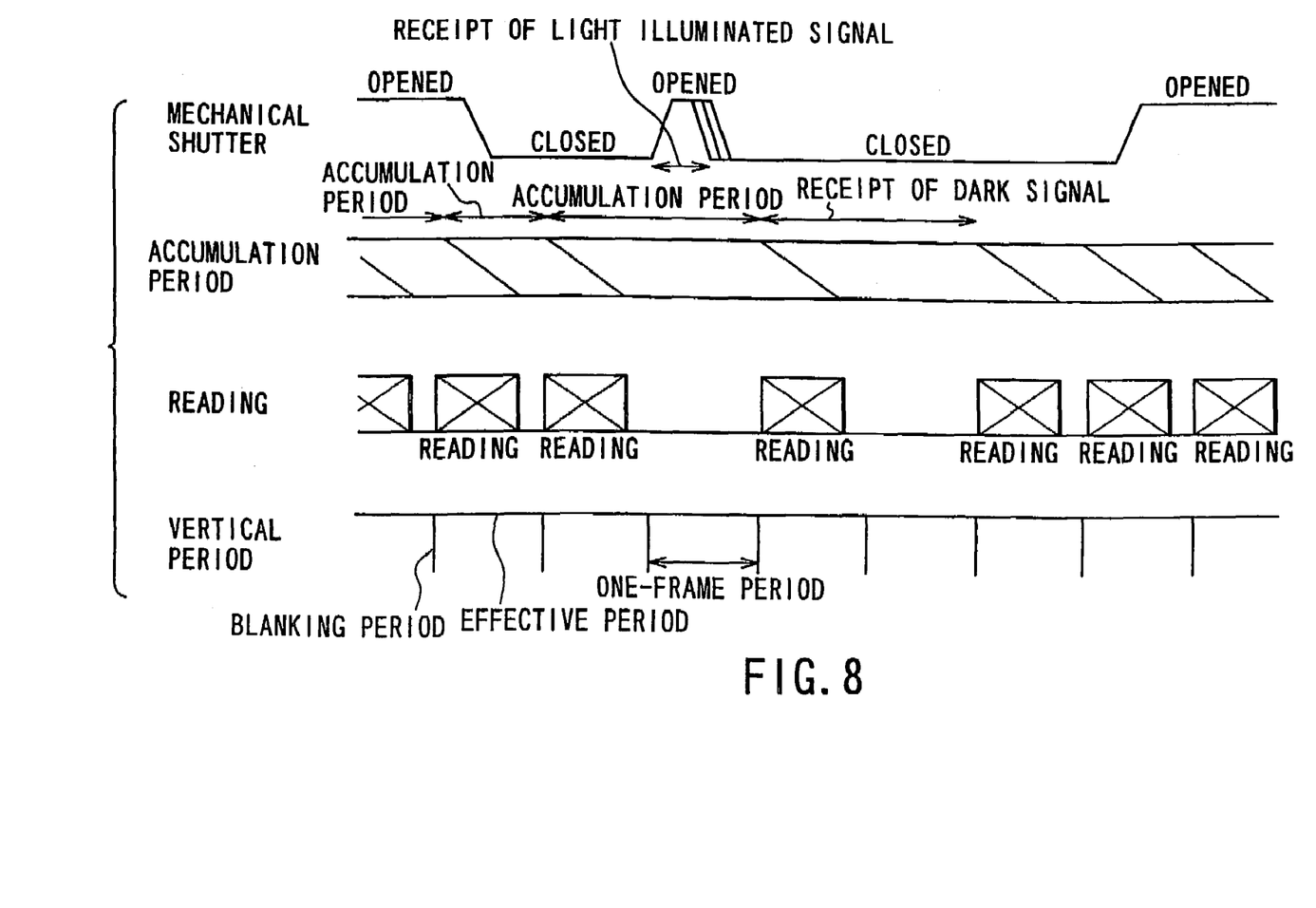
FIG. 8 is also a timing chart explaining how a modification of the second embodiment operates.

FIG. 8 explains how the solid-state image pickup apparatus, which is the second embodiment, operates if the photodiode provided in each unit cell is of complete transfer type.

Since the photodiodes are of complete transfer type, image lags or linearity problem will not arise. Hence, it is unnecessary to reset the image sensor as is illustrated in FIG. 7. Therefore, as shown in FIG. 8, signals are read from the unit cells also during the period that corresponds to the reset period (FIG. 7). More precisely, light illuminated signals are accumulated in the image sensor, then the light illuminated signals are read from the image sensor. After the light illuminated signals have been read, dark signals are accumulated in the image sensor, then the dark signals are read from the image sensor. The difference between each light illuminated signal and the corresponding dark signal is obtained, thereby removing noises such as background irregularities and white defects. If these noises are not so prominent, it is unnecessary to store the dark signals into the line memory, as in the case where the photodiodes are of incomplete transfer type.

Third Embodiment

The third embodiment of this invention, which is also a solid-state image pickup apparatus of amplification type, will be described with reference to the timing charts of FIG. 9. The unit cells of the image sensor incorporated in the third embodiment have a structure similar to the one depicted in FIG. 2.

Figure 9:
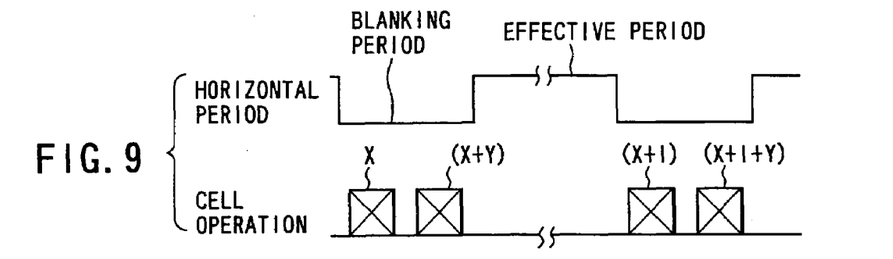
FIG. 9 is a timing chart showing how the third embodiment operates, mainly during the horizontal period.

As shown in FIG. 9, signals are read from the unit cells of the Xth row and (X+Y)th row during the same horizontal blanking period. During the next horizontal blanking period, signals are read from the unit cells of the (X+1)th and (X+1+Y)th row.

Assume that T rows of unit cells serve to accumulate signal charges for one frame. In this case, the signal accumulated in any unit cell for the period corresponding to (T-Y) rows is read into the line memory during a horizontal blanking period, and the signal accumulated in the same unit cell for the period corresponding to Y rows is read into the line memory during another horizontal blanking period. These two signals are read from the line memory at the same time and added by a signal-processing circuit provided outside the image pickup apparatus (i.e., one-chip apparatus). Since the periods differ in length, the dynamic range of the image pickup apparatus can be increased.

Figure 10:
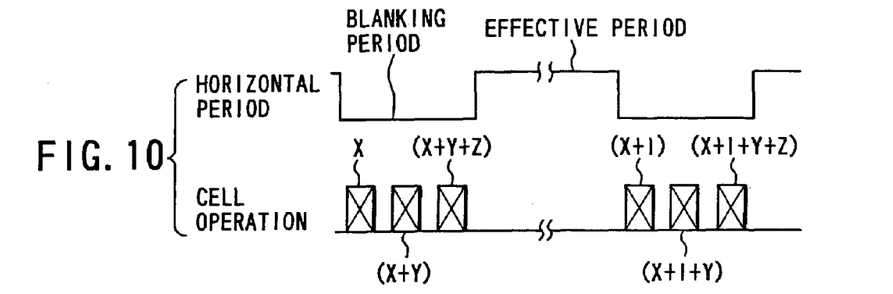
FIG. 10 is a timing chart illustrating how a modification of the third embodiment operates, mainly during the horizontal period.

FIG. 10 shows the case where signals are read from the unit cells of the Xth row, (X+Y)th row and (X+Y+Z)th row during the same horizontal blanking period.

Assume that T rows of unit cells serve to accumulate signal charges for one frame. Then, the signal accumulated in any unit cell for the period corresponding to (T-Y-Z) rows is read into the line memory during a horizontal blanking period. The signal accumulated in the same unit cell for the period corresponding to Y rows is read into the line memory during another horizontal blanking period. The signal accumulated in the same unit cell for the period corresponding to Z rows is read into the line memory during still another horizontal blanking period. These signals are read from the line memory at the same time and added by a signal-processing circuit provided outside the image pickup apparatus (i.e., one-chip apparatus). In this case, too, the periods differ in length, and the dynamic range of the image pickup apparatus can be increased. This method of reading signals can be applied because random access is possible with a solid-state image pickup apparatus of amplification type.

Figure 11:
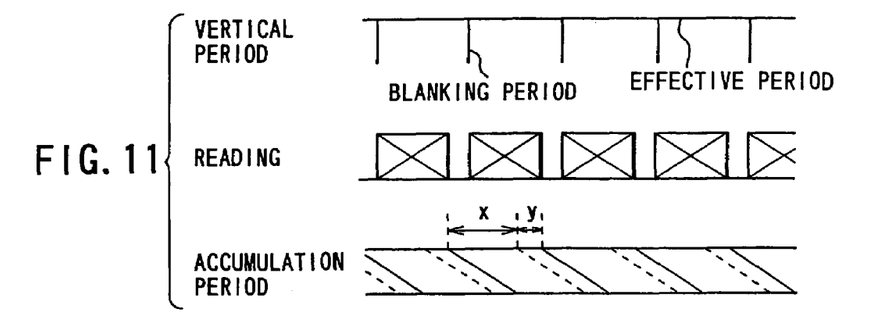
FIG. 11 is a timing chart explaining how the third embodiment operates, mainly during the vertical period.

FIG. 11 explains how the third embodiment operates, mainly during the vertical period. Signals are read from the unit cells during the period between a vertical blanking period and a next vertical blanking period. The accumulation period is divided into two sub-periods x and y. The signal accumulated in a unit cell during the relatively long period x is read to the vertical signal line during a horizontal blanking period. The signal accumulated in the unit cell during the relatively short period y is read to the vertical signal line during a different horizontal blanking period. These signals, thus read, from the unit cell, are stored into line memories, respectively. The Y-axis of the graph showing the accumulation periods x and y corresponds to the vertical direction of the image sensor 11 (FIG. 1), along which the accumulation of signal charges proceeds.

Figure 12:
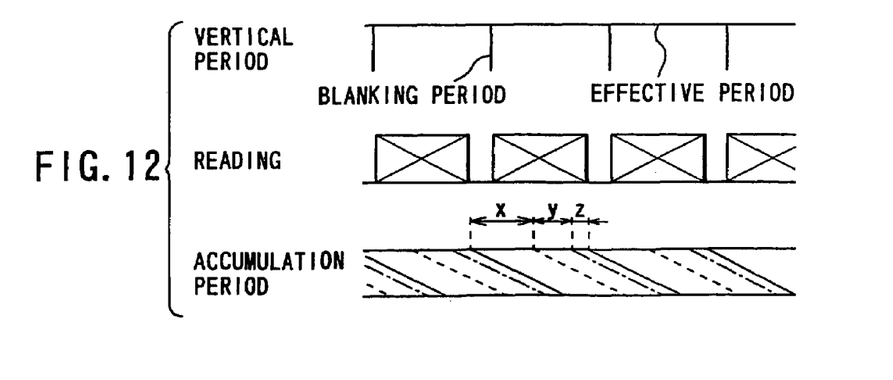
FIG. 12 is a timing chart explaining how a modification of the third embodiment operates, mainly during the vertical period.

FIG. 12 explains how the third embodiment operates, mainly during the vertical period, in another manner. The accumulation period is divided into three sub-periods x, y and z. The signal accumulated in a unit cell during the relatively long period x is read to the vertical signal line during a horizontal blanking period. The signal accumulated in the unit cell during the relatively short period y is read to the vertical signal line during another horizontal blanking period. The signal accumulated in the unit cell during the period z shorter than the period y is read to the vertical signal line during still another horizontal blanking period. These signals, thus read, from the unit cell, are stored into line memories, respectively.

Figure 13:
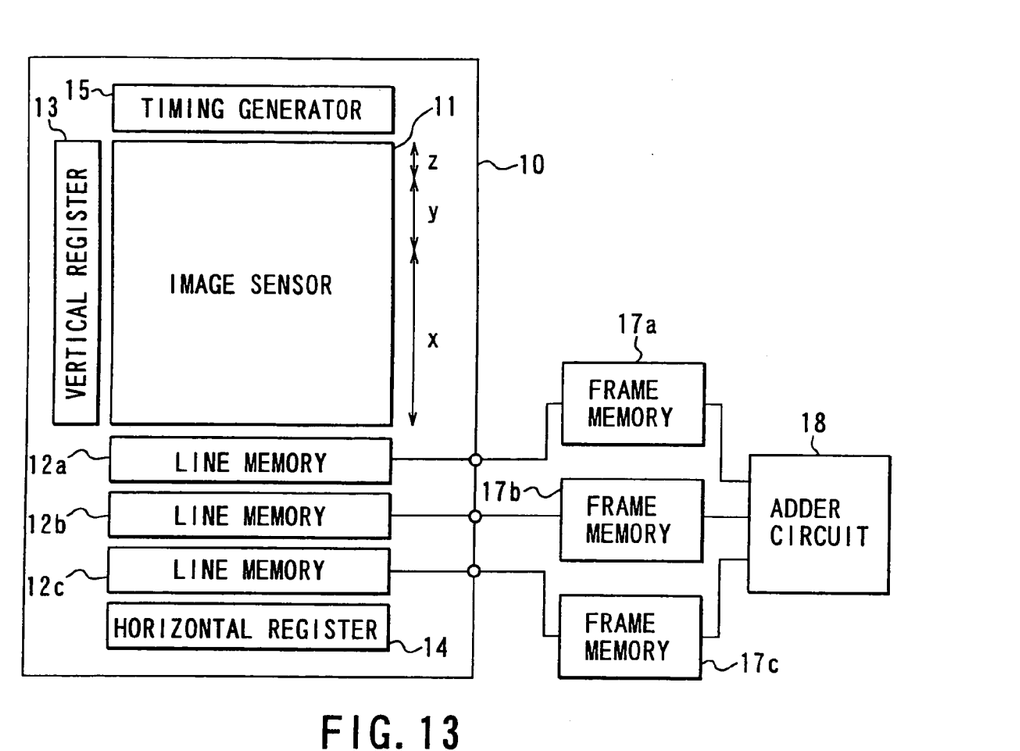
FIG. 13 is a block diagram depicting the basic structure of a solid-state image pickup apparatus of amplification type, which is the third embodiment of the invention.

FIG. 13 is a schematic representation of the third embodiment of the invention. The third embodiment is similar to the first embodiment (FIG. 1) in basic structure. The solid-state image pickup apparatus shown in FIG. 13 is so designed that signals are read from the unit cells in such a manner as has been explained with reference to FIGS. 10 and 12.

In this apparatus, a one-frame period is divided into three sub-periods x, y and z. The signals are read from different rows of unit cells to the vertical signal lines during the same horizontal blanking period when the vertical register 13 supplies a control signal to the image sensor 11. The signals read to the vertical lines are temporarily stored in the line memories 12a, 12b and 12c. (The line memories are provided, each for storing a one-line data.) The signals are read from the line memories 12a, 12b and 12c when the horizontal register 14 supplies a signal to the line memories 12a, 12b and 12c. The signals thus read are stored respectively into frame memories 17a, 17b and 17c, respectively. The frame memories 17a to 17c are provided outside the chip 10 in which the image sensor 11, line memories 12a to 12c, vertical register 13, horizontal register 14 and timing generator 15 are provided. Of the signals stored in the frame memories 17a to 17c, those read from the same unit cell during different horizontal blanking periods (i.e., signals accumulated during different periods) are added by an adder circuit 18, which generates a sum signal. An image will be synthesized from the sum signal.

The photoelectric conversion characteristic of the third embodiment will be explained with reference to FIGS. 14 and 15.

Figure 14:
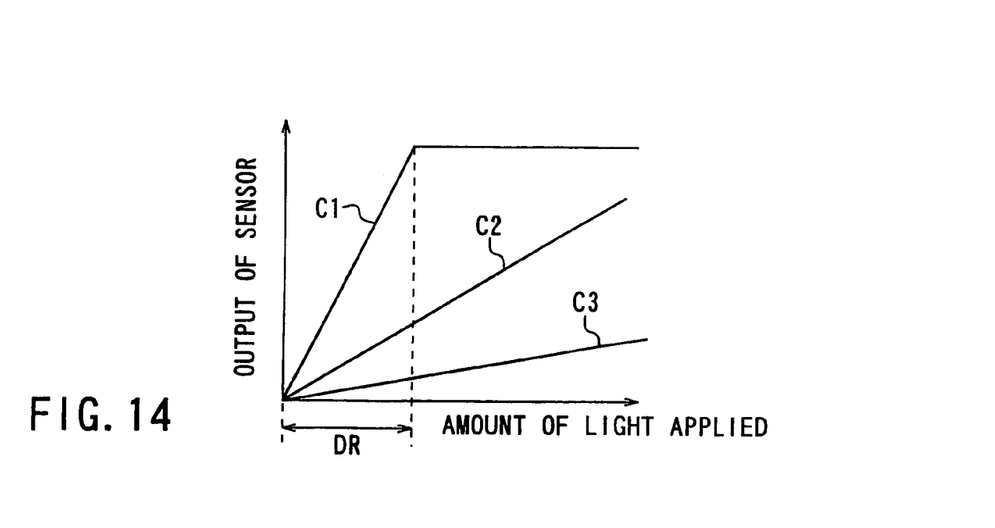
FIG. 14 is a graph representing the relation between the amount of light input to the third embodiment and the output generated by the sensor provided in the third embodiment.

As shown in FIG. 14, the image sensor 11 exhibits photoelectric conversion characteristic C1 during the accumulation sub-period x, photoelectric conversion characteristic C2 during the accumulation sub-period y, and photoelectric conversion characteristic C3 during the accumulation sub-period z. As can be seen from FIG. 14, the image sensor 11 generates the largest output during the accumulation sub-period x. The sensor 11 generates the second largest output during the accumulation sub-period y and the smallest output during accumulation sub-period z.

Generally, a photodiode cannot accumulate more charge once it has accumulated a saturated signal charge. Hence, any image pickup apparatus that has unit cells each having a photodiode has such a dynamic range DR as is illustrated in FIG. 14. The dynamic range DR is about 60 to 70 dB at most.

Figure 15:
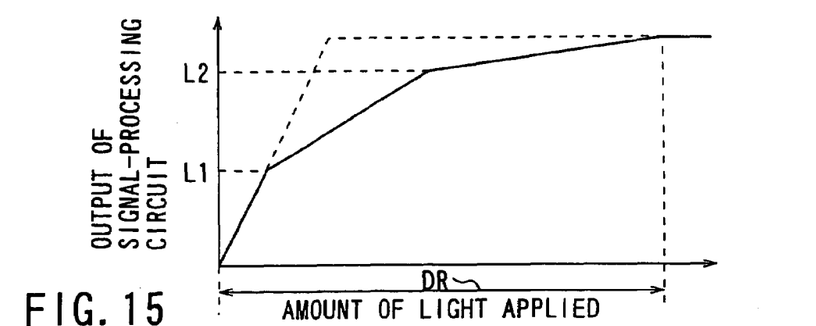
FIG. 15 is a graph showing the relation between the amount of light input to the third embodiment and the output generated by the signal-processing circuit incorporated in the third embodiment.

By contrast the synthesized signal generated by the signal-processing circuit shown in FIG. 13, which comprises the frame memories 17a to 17c and the adder circuit 18, has a longer dynamic range DR as is illustrated in FIG. 15. As may be understood from FIG. 15, that part of the synthesized signal which ranges up to output level L1 corresponds to the photoelectric conversion characteristic C1. That part of the synthesized signal, which ranges between output levels L1 and L2 corresponds to the photoelectric conversion characteristic C2. That part of the synthesized signal, which is above output level L2, corresponds to the photoelectric conversion characteristic C3.

Thus, in the third embodiment has the dynamic range DR shown in FIG. 14 is increased to the dynamic range DR shown in FIG. 15.

Fourth Embodiment

Figure 16:
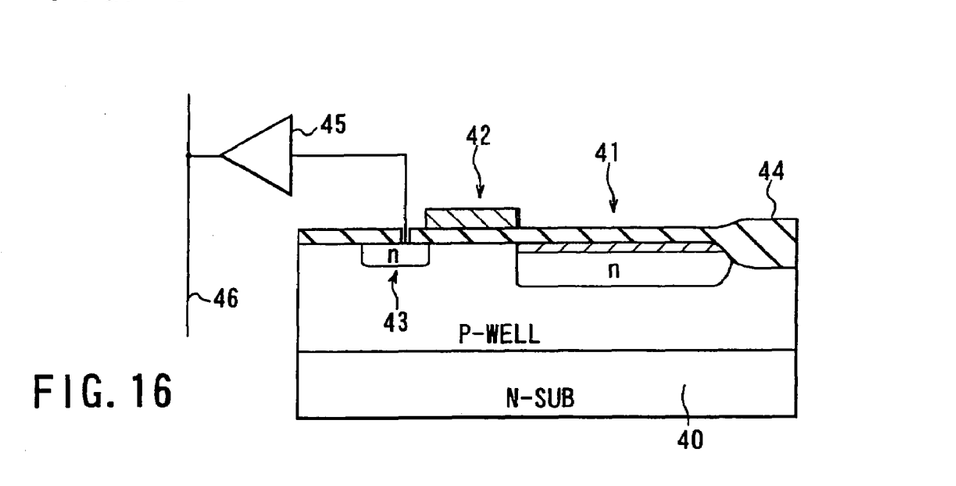
FIG. 16 is a sectional view showing mainly one of the unit cells incorporated in an image pickup apparatus which is the fourth embodiment of the present invention.

FIG. 16 is a sectional view showing mainly one of the unit cells incorporated in an image pickup apparatus that is the fourth embodiment of the invention. The unit cell is similar to the one shown in FIG. 3 in terms of basic structure.

As shown in FIG. 16, the unit cell comprises a photodiode 41, a transfer (read) transistor 42, and a detection node 43. (The photodiode 41 has a p-type region in the surface of a charge-accumulating region of n type.) The photodiode 41, transistor 42 and node 43 are provided on an N-type silicon substrate 40 that has a P-type well in the surface. The unit cell is electrically isolated from any other unit cell by a LOCOS element-isolating region 44.

A signal charge is transferred from the photodiode 41 to the detection node 43 via the transfer transistor 42. The detection node 43 has parasitic capacitance, which converts the signal charge to a signal voltage. The signal voltage is applied via an amplifier 45 to a signal line 46 and is stored in a line memory (not shown).

Figure 17:
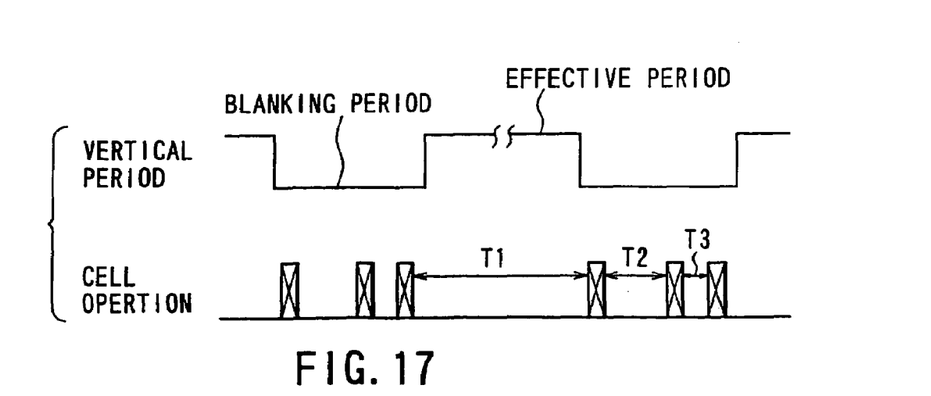
FIG. 17 is a timing chart explaining how the fourth embodiment operates, mainly during the vertical period.

FIG. 17 is a timing chart explaining the operation of the fourth embodiment having the unit cells (FIG. 16).

In the first to third embodiments described above, data is read from the unit cells, line by line. Thus, it is easy to scan the unit cells. However, a one-frame time lag inevitably occurs between the first line and the last line. The simultaneity, in the first to third embodiments, is therefore lower than is possible with CCD-type solid-state image pickup apparatuses. This give rise to no problems if the frame frequency is sufficiently high or the image picked up and reproduced is one that moves slowly. If the frame frequency is low or the image is one that moves fast, the image reproduced will be blurred.

The fourth embodiment is a solid-state image pickup apparatus of amplification type in which can pick up images with high simultaneity (start time and end time for accumulating charges are same in all unit cells). More specifically, the unit cells of all rows (lines) are operated during same vertical blanking period as illustrated in FIG. 17. As FIG. 17 shows, the unit cells are operated three times during each vertical blanking period. Instead, they may be operated once, twice, four times, or more times during each vertical blanking period.

It will be described how the unit cells are operated only once during each vertical blanking period. First, all detection nodes 43 are reset. Further, all transfer transistors 42 are turned on. A signal charge is thereby supplied to each detection node 43 and accumulated in the parasitic capacitance of the node 43. To increase capacitance to hold the signal charge, a capacitor may be connected in parallel to the parasitic capacitance. Thus, all signal charges are accumulated in the respective detection nodes 43 during same vertical blanking period. The signal charges are sequentially read, line by line, from the image sensor during the horizontal blanking period included in the vertical effect period that follows the vertical blanking period. As a result, the fourth embodiment can pick up an image with as high simultaneity as is possible with CCD-type solid-state image pickup apparatuses.

With reference to the timing chart of FIG. 17, it will be described how the unit cells are operated three times during same vertical blanking period. In this case, too, the unit cells of all rows (lines) are operated during same vertical blanking period in order to pick up an image with high simultaneity. Further, a part of the signal charge is skimmed from each detection node and signals are added in the detection node 43, as in the first embodiment, thereby increasing the dynamic range of the image pickup apparatus. That is, the first accumulation is effected during period T1, the second accumulation during period T2, and the third accumulation during period T3, as is illustrated in FIG. 17.

Figure 18:
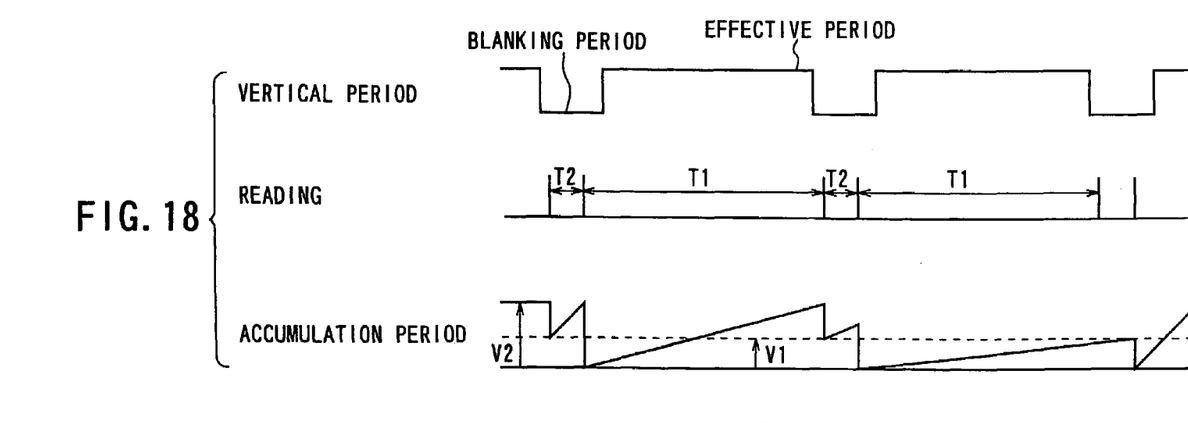
FIG. 18 is a timing chart explaining how the fourth embodiment operates, mainly during the vertical period.
Figure 19:
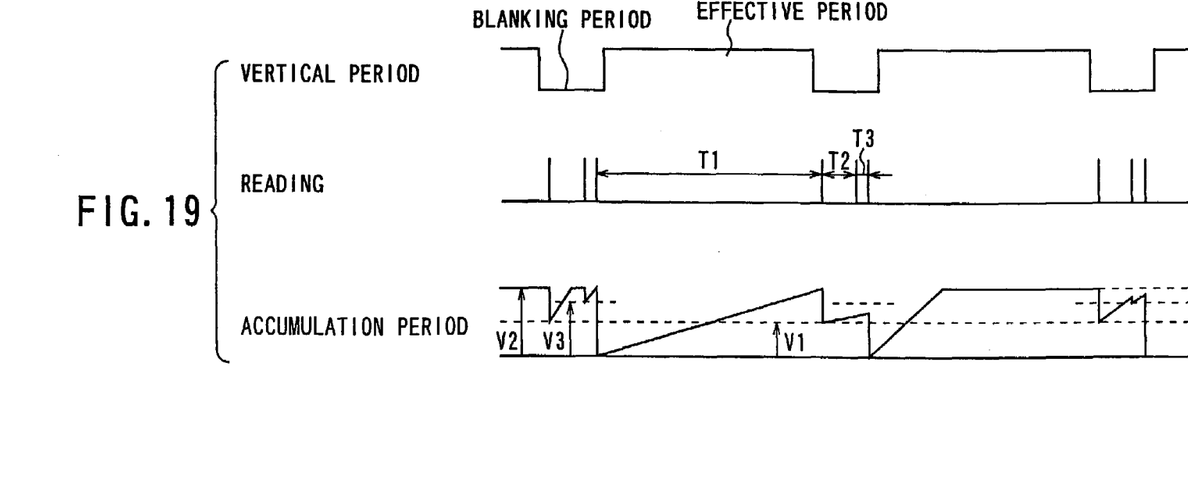
FIG. 19 is a timing chart explaining how another modification of the fourth embodiment operates, mainly during the vertical period.

The operation of the fourth embodiment will be explained in greater detail, with reference to FIGS. 18 and 19. FIG. 18 is a timing chart showing how signal charges are accumulated twice during a one-frame period. FIG. 19 is a timing chart explaining how signal charges are accumulated three times during a one-frame period.

How signal charges are accumulated twice during a one-frame period will be described with reference to FIG. 18. First, that part of the signal charge accumulated in the detection node 43 during the accumulation period T1, which is at a voltage higher than a voltage V1, is skimmed from the detection node 43 as in the first embodiment in the vertical blanking period. No parts of the signal charge will be skimmed if the voltage built up by the signal charge is lower than the voltage V1. If the voltage is higher than the voltage V1, the output signal of the detection node 43 will be set to the voltage V1 at a time T1. Then, the signal charge accumulated in the photodiode 41 in the period T2 is added to the signal charge held in the detection node 43, whereby a voltage signal is generated. This voltage signal is read from the unit cell during the vertical blanking period. Thus, a part of a signal charge is skimmed and signal charges are added in the unit cells of all rows (all lines) during the same vertical blanking period. In this respect, the fourth embodiment differs from the first embodiment in which a part of a signal charge is skimmed and signal charges are added in the unit cells of one row, then in the unit cells of the next row, and so on.

How signal charges are accumulated three times during a one-frame period will be described with reference to FIG. 19. First, that part of the signal charge accumulated in the detection node 43 during accumulation period T1, which is at a voltage higher than a voltage V1, is skimmed from the detection node 43 as in the first embodiment in the vertical blanking period. Thereafter, the signal charge accumulated in the photodiode 41 in accumulation period T2 is added to the signal charge that corresponds to the voltage V1. Of the signal charge held in the detection node 42, the part which corresponds to a voltage higher than voltage V3 is skimmed during the vertical blanking period. Then, the signal charge accumulated in the photodiode during accumulation period T3 is added to the signal charge held in the detection node 43. A voltage signal is thereby generated. This voltage signal is read from the unit cell during the same vertical blanking period.

The solid-state image pickup apparatus of amplification type according to the fourth embodiment can not only have an increased dynamic range, but also satisfy a high simultaneity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image pickup apparatus comprising:
   an array of unit cells arranged in rows and columns, each having a light-receiving device operable to receive light and generate an electric charge corresponding to the light;
   a plurality of vertical signal lines extending along the columns of unit cells, respectively, each operable to receive an electric data item corresponding to the electric charge generated by the light-receiving device of any unit cell of the associated column;
   a control circuit operable to control each of the unit cells of the same row such that electric data items corresponding to electric charges generated by the same light-receiving device and accumulated during different periods differing in length, respectively, are read through the vertical signal line during different horizontal blanking periods, and to control each of the unit cells of different rows such that electric data items corresponding to electric charges generated by the light-receiving devices of different rows and accumulated during different periods differing in length, respectively, are read through the vertical signal line during a same horizontal blanking period; and
   a plurality of data-holding circuits operable to temporarily hold the electric data items corresponding to electric charges accumulated during different periods differing in length, respectively, and read by the control circuit, so as to add the electric data items in an external circuit.

2. An image pickup apparatus comprising:
   an array of unit cells arranged in rows and columns, each having a light-receiving device operable to receive light and generate an electric charge corresponding to the light;
   a plurality of vertical signal lines extending along the columns of unit cells, respectively, each operable to receive an electric data item corresponding to the electric charge generated by the light-receiving device of any unit cell of the associated column;

a vertical control circuit operable to control the unit cells such that electric data items corresponding to electric charges generated by the light-receiving devices of different rows and accumulated during different periods differing in length, respectively, are read to the vertical signal line during the same horizontal blanking period, and such that electric data items corresponding to electric charges generated by the same light-receiving device and accumulated during different periods differing in length, respectively, are read through the vertical signal line during different horizontal blanking periods;

a plurality of data-holding circuits operable to temporarily hold the electric data items corresponding to electric charges accumulated during different periods differing in length, respectively, and read from the unit cells of different rows during the same horizontal blanking period under the control of the vertical control circuit;

a horizontal control circuit operable to control reading of the electric data items from the data-holding circuits;

a storage circuit configured to store the electric data items read from the data-holding circuits under the control of the horizontal control circuit; and an adder circuit operable to add the electric data items stored in the storage circuit, which correspond to the electric charges generated by the same light-receiving device and accumulated during different periods differing in length, respectively.

* * * * *